No. 884,039. PATENTED APR. 7, 1908.
F. A. PETERSON.
VOTING MACHINE.
APPLICATION FILED APR. 20, 1905.

6 SHEETS—SHEET 4.

Witnesses

Inventor
Frans A. Peterson
By Foster Freeman Watson
Attorneys

No. 884,039.
PATENTED APR. 7, 1908.
F. A. PETERSON.
VOTING MACHINE.
APPLICATION FILED APR. 20, 1905.
6 SHEETS—SHEET 5.
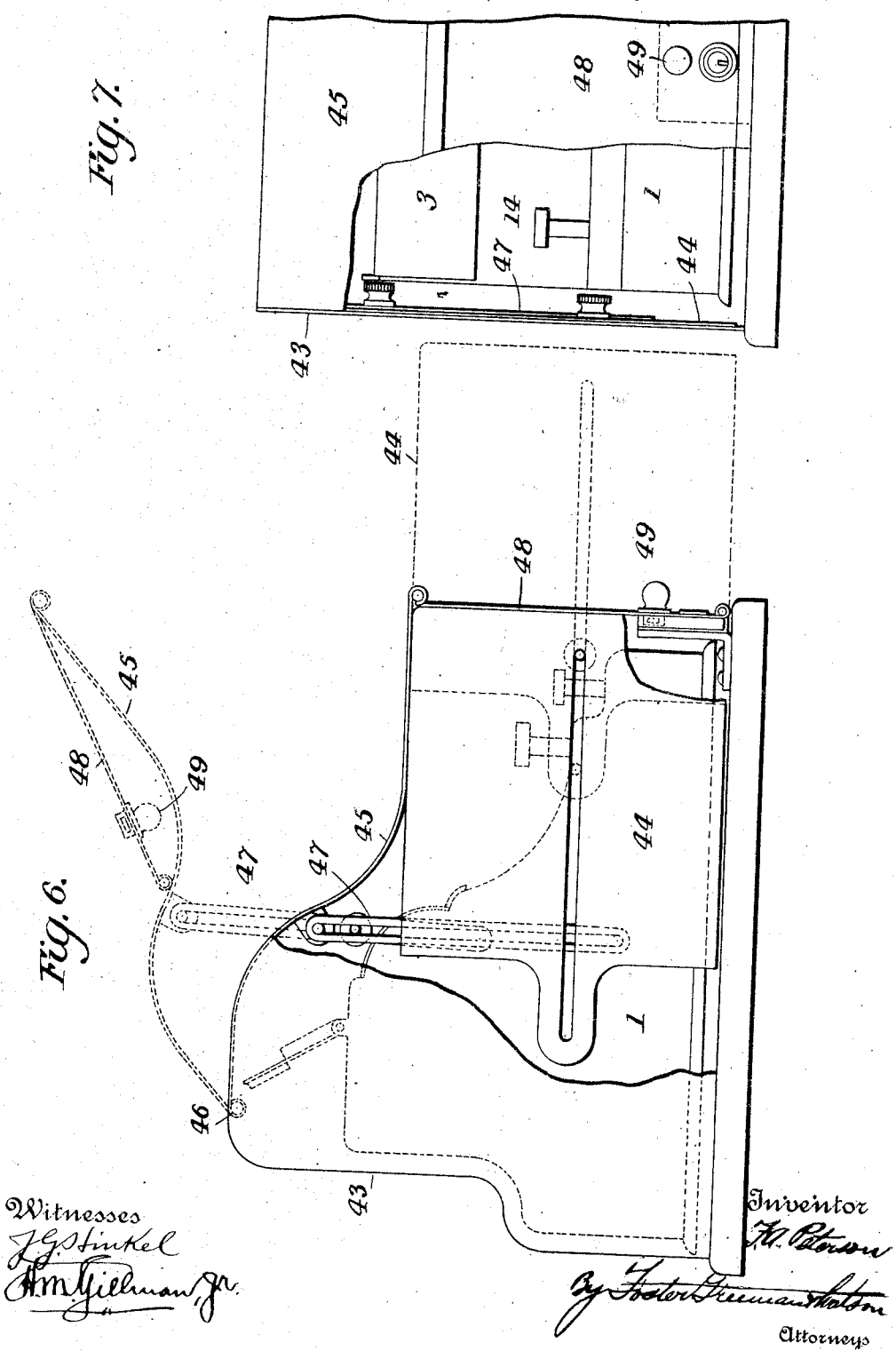

No. 884,039.
PATENTED APR. 7, 1908.
F. A. PETERSON.
VOTING MACHINE.
APPLICATION FILED APR. 20, 1905.
6 SHEETS—SHEET 6.
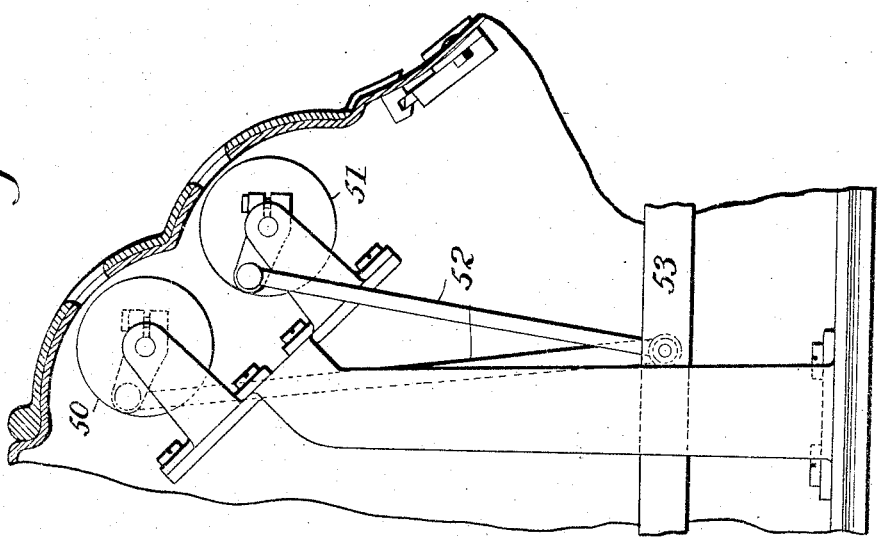
Witnesses
Inventor
Hans A. Peterson
By Foster Freeman
Attorneys

UNITED STATES PATENT OFFICE.

FRANS A. PETERSON, OF SYRACUSE, NEW YORK.

VOTING-MACHINE.

No. 884,039.  Specification of Letters Patent.  Patented April 7, 1908.

Application filed April 20, 1905. Serial No. 256,571.

*To all whom it may concern:*

Be it known that I, FRANS A. PETERSON, a citizen of the United States, residing at Syracuse, Onondaga county, State of New York, have invented certain new and useful Improvements in Voting-Machines, of which the following is a specification.

The present invention relates to an improvement in voting machines particularly adapted for use in clubs, societies, and similar organizations, and has for its object to provide a compact and simple mechanism, by which the total number of votes for and against a particular candidate, or regarding a particular subject can be readily and accurately accumulated.

A further object of the invention is to provide such a machine with means whereby only the voter, or party operating the machine, is advised of the nature of the vote recorded by his actuation of the machine, means being provided, however, for preventing any person from secretly actuating the machine except in accordance with the rules provided for the use thereof.

The invention may be embodied in machines of various forms, but in the accompanying drawings there is shown an embodiment of the invention adapted for voting affirmatively and negatively on a plurality of subjects.

Figure 1:
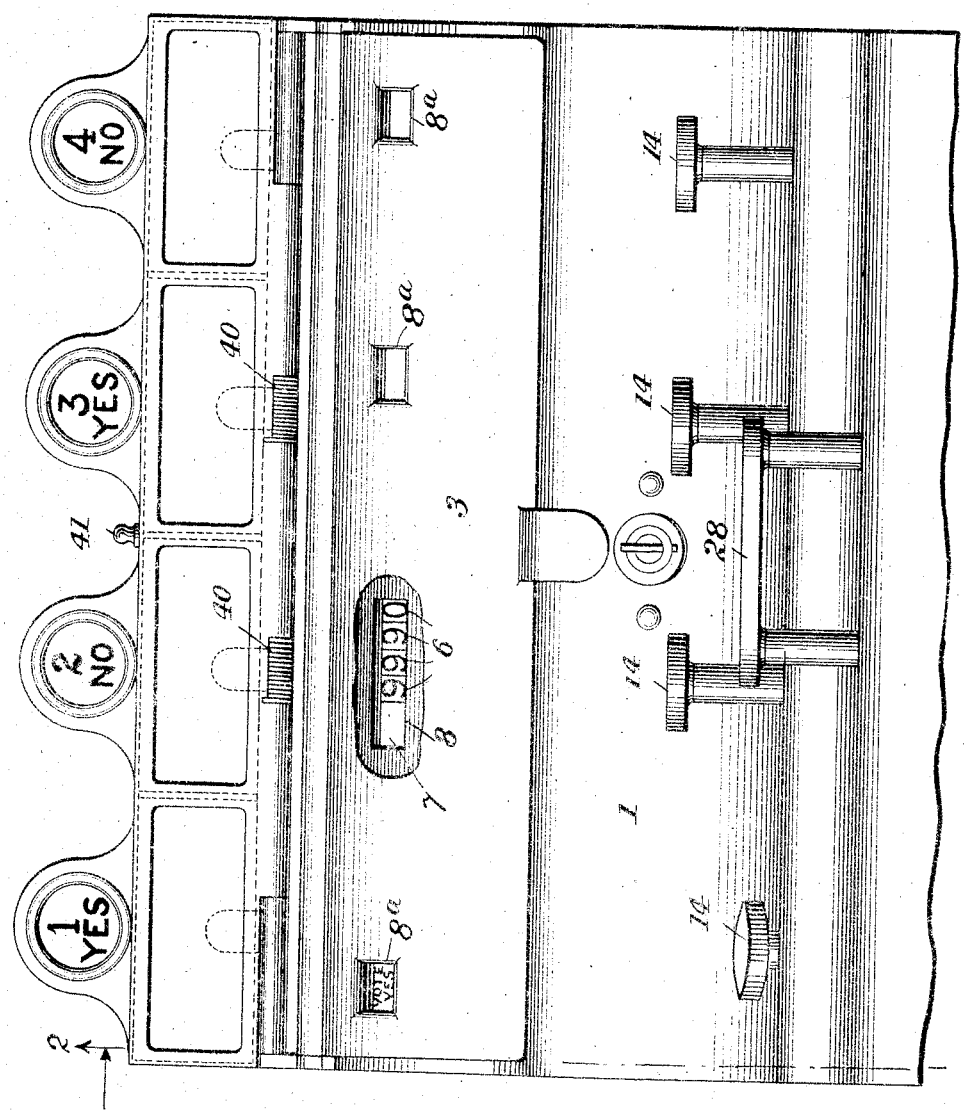
Figure 2:
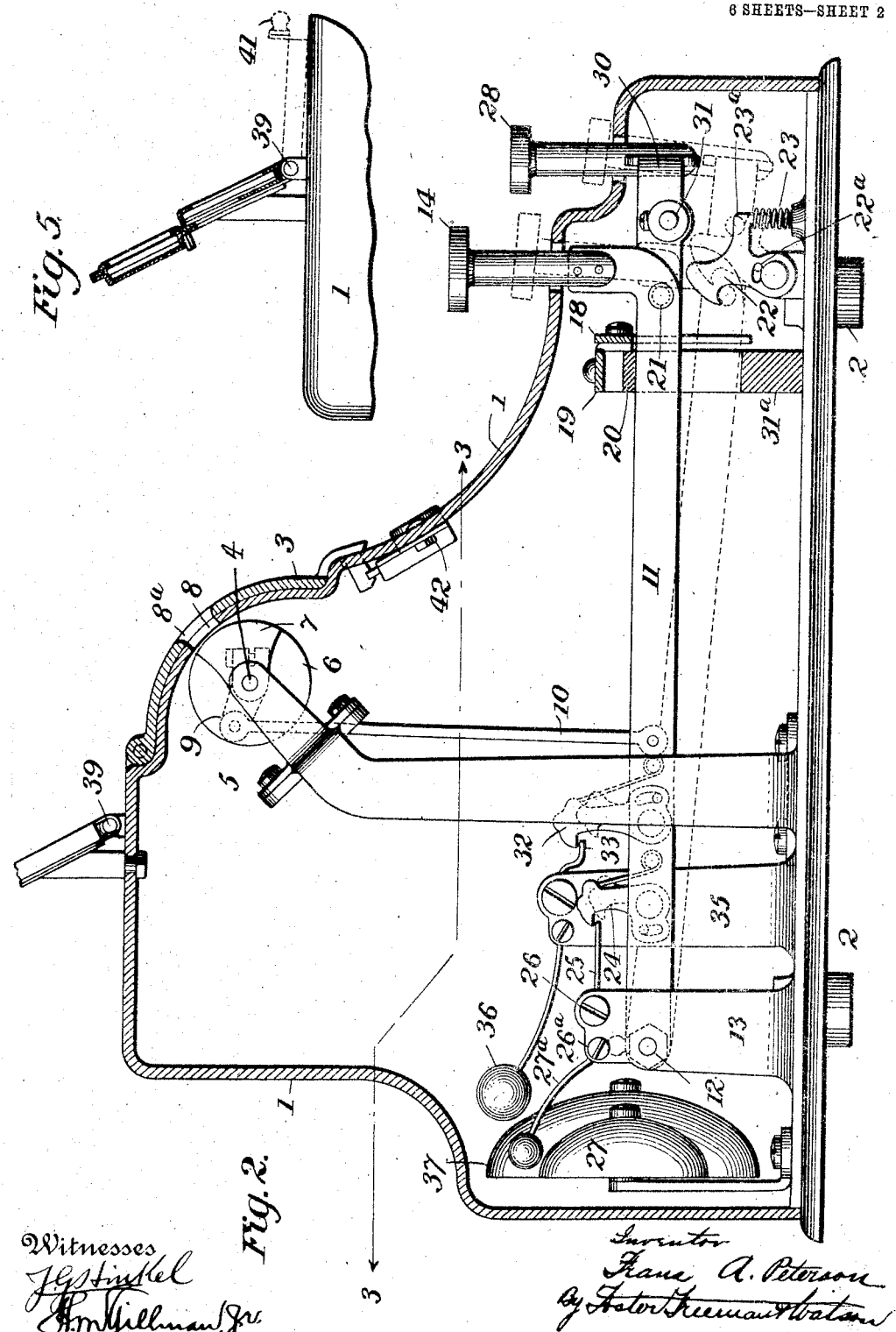
Figure 3:
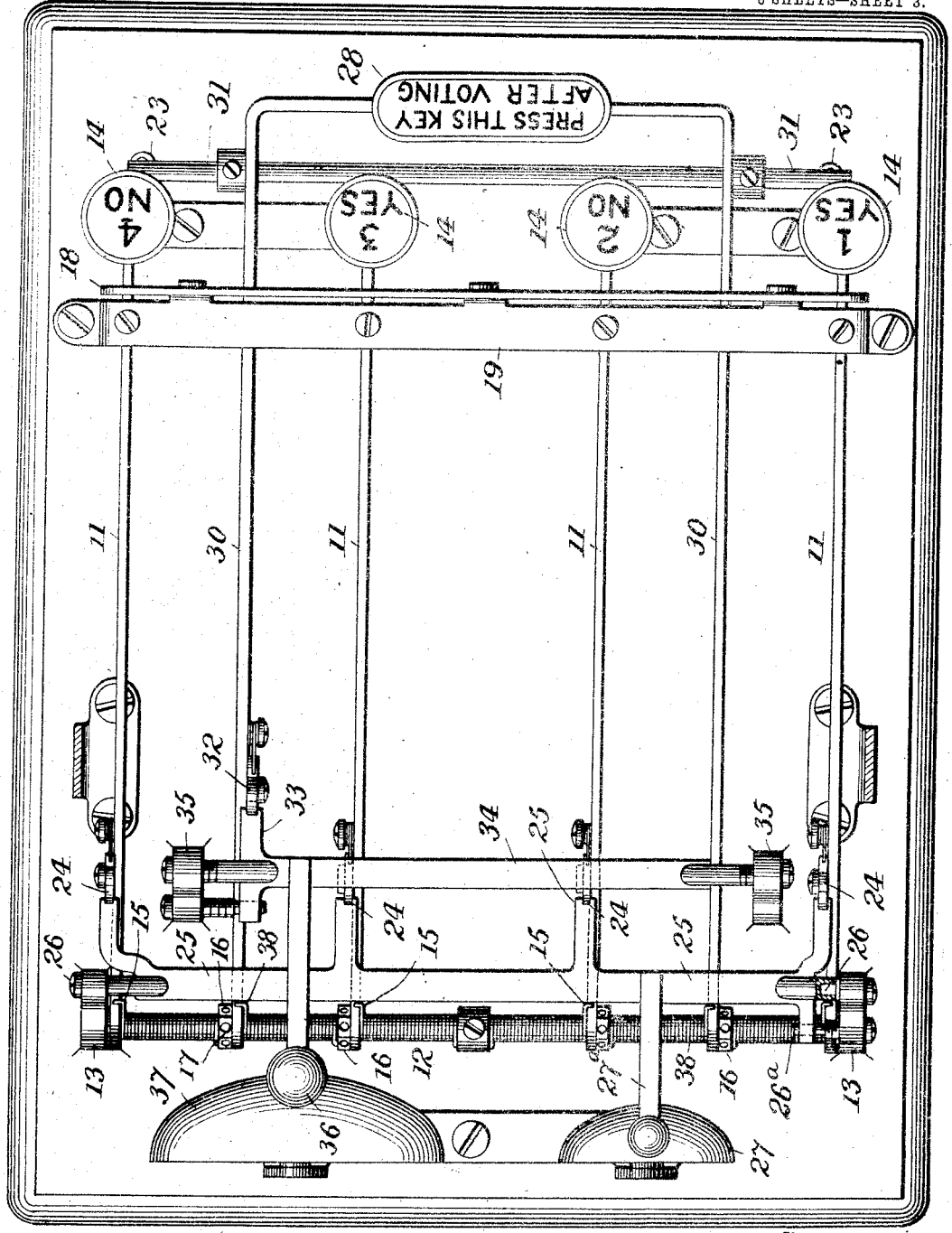
Figure 4:
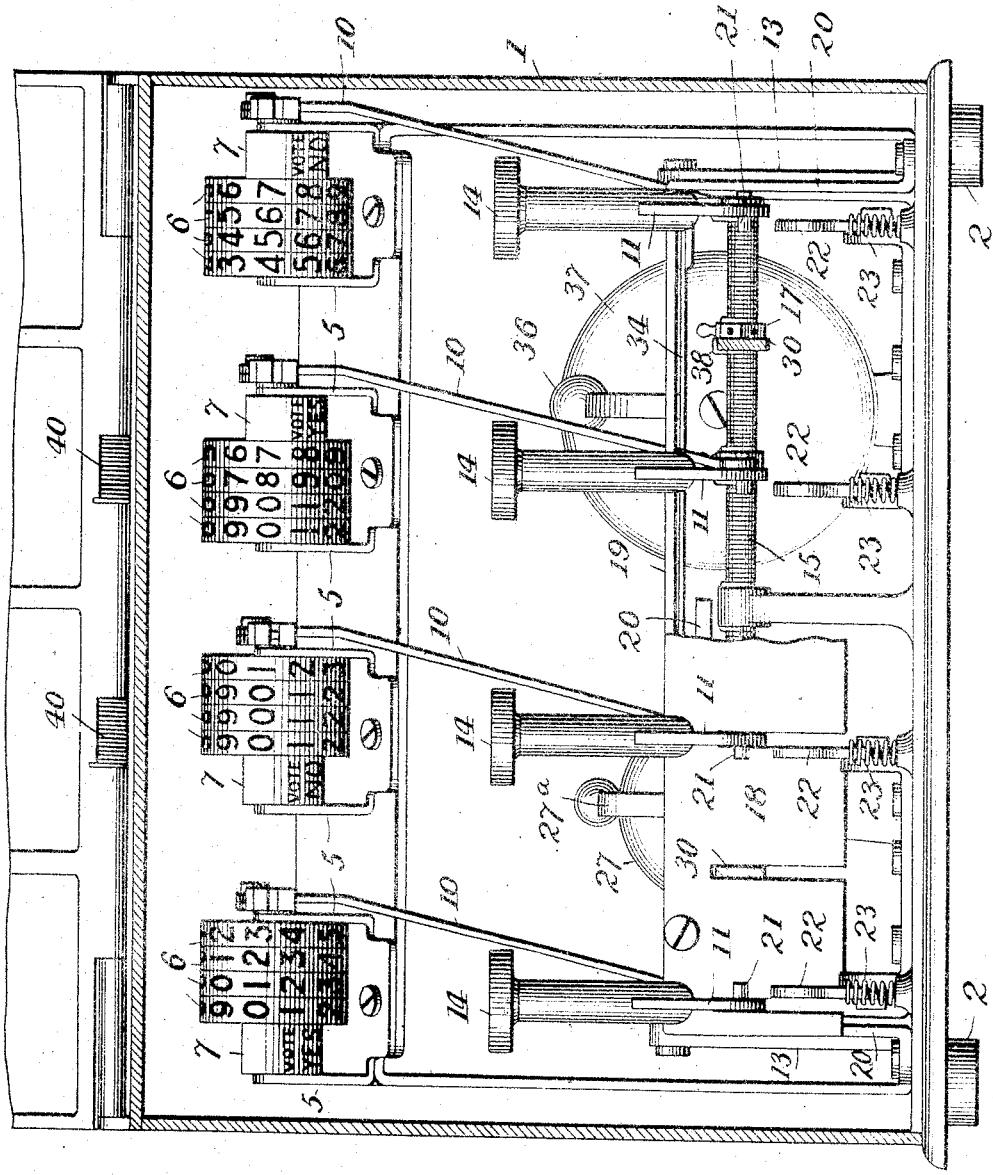

In the accompanying drawings,—Figure 1 is a front elevation of a machine constructed in accordance with the present invention; Fig. 2 is a sectional view, substantially on the line 2—2 of Fig. 1; Fig. 3 is a horizontal sectional view, substantially on the line 3—3 of Fig. 2; Fig. 4 is a transverse vertical sectional view through the machine; Fig. 5 is a sectional view, on an enlarged scale, of the holder for the index card; Figs. 6 and 7 are respectively a side elevation and front view of the inclosing case within which the machine is arranged; Fig. 8 illustrates a slight modification.

Referring to the drawings, it will be seen that the apparatus includes a suitable framework 1, the base of which may be provided with elastic cushions or feet 2 and in the front wall of which is formed an opening adapted to be closed by a swinging lid or door 3. Mounted upon shafts 4, supported in suitable frames 5 within the housing 1, are a series of counting mechanisms, of which any desired number may be provided. Such mechanisms are arranged in pairs, there being a pair for every question or candidate to be voted on or for, the members of each pair being respectively employed to record the number of votes for and against the question or candidate to which they refer. The accumulating parts of such counting mechanisms may be of any desired construction and as various forms of devices adapted for such purpose are well known and do not form any part of the present invention, they are only conventionally illustrated. The only essential feature of this part of the apparatus is that each counting or accumulating mechanism shall include a plurality of numbered wheels or disks 6; and with each of such counting mechanisms is associated a sector 7 bearing on its periphery words indicative of the character of the vote which is to be recorded by the associated counting mechanism. As shown the sector 7 adjacent the left hand member of each pair of counting mechanisms has the words "Vote, yes" arranged on the lower half of its periphery and the corresponding sector of the right hand member of each pair of counting mechanisms has the words "Vote, no" similarly arranged. Normally the sectors 7 of the adding or counting mechanisms which are secured to the shafts 4 are held in such position that the upper blank portion on each is displayed through suitable slots or apertures 8, 8ᵃ, formed in the front wall of the housing 1 and in a swinging cover or lid which is adapted to close a portion of each slot 8 in said housing. At each actuation of either counter, by means hereinafter described, the sector 7 associated with such counter will be turned a distance sufficient to bring the inscription thereon into alinement with the apertures 8, 8ᵃ; and, after the vote has been recorded, said sector 7 will, as the shaft 4 and operating means return to normal positions, be restored to its original position in which the blank portion thereof will be exposed through the openings 8, 8ᵃ. That is, at each voting operation the voter is enabled to see which of the counting mechanisms he has actuated but such indication of every vote is withdrawn or concealed before a subsequent operation of the machine.

The counting mechanisms are actuated as follows: On the shaft 4 of each counting mechanism is mounted an arm 9, which is connected by a link 10 with a key lever 11. Each of said arms 9 is adapted to actuate the adjacent mechanism whenever its corresponding key lever 11 is depressed and as above described when either shaft 4 is rocked the sector 7 thereon is moved to indicate that the associated counting mechanism has been actuated. The levers 11 are fulcrumed on a rod 12 supported in suitable brackets 13 attached to the base of the main frame 1 and at their forward ends each of said levers is provided with a key 14 on the upper surface of which may be displayed information indicating the character of the vote, which will be recorded by the actuation of the particular key. The keys may, as shown, be numbered from left to right and alternately bear the words "Yes" and "No", the key marked "1, yes", being adapted to actuate that member of the counting devices which is adapted to record the several votes in favor of the proposition or candidate to which the first pair of counting devices relates. The key marked "2, no" is adapted to actuate the other member of said pair of counting devices which is to record the votes in opposition to the question or candidate to which the first pair of counting mechanisms relates.

Each key lever 11 is connected with one end of a tension spring 15 coiled about the rod 12 and having its other end connected to a collar 16. Said collar is secured in any desired position on the rod by a suitable pin extending through passages 17 formed in the collar and an alined passage in the rod. The pin may be readily withdrawn to permit of rotation of the collar 16 to vary the tension of the spring 15 as desired. Near their forward ends the levers 11 are guided by a comb 18 fastened to a cross bar 19 supported by standards arranged at opposite sides of the machine. To the lower face of said cross bar is secured a cushion 20 against which the upper edges of the key levers are normally held by the tension springs 15. Each key lever is provided, in advance of the comb 18, with a laterally projecting pin or stud 21 which, as the key lever is depressed, by pressure on the key 14, passes beneath and is engaged by a latch 22 pivotally mounted in a suitable support on the base of the machine. Each latch 22 is adapted to rock about its pivot for a limited distance determined by a pin 22$^a$ hereon extending into a slot in the bearing for the latch; and a spring 23 arranged between the base of the machine and an arm 23$^a$ on the latch, normally holds the latter in position to engage the stud 21. Each key lever is also provided with a pivotally mounted trip 24 adapted, as the lever is depressed, to engage a cross bar 25 mounted at its ends upon suitable pivots 26 and having a bell hammer 27$^a$ connected therewith. As either key is depressed the trip 24 connected therewith will rock the cross bar 25 and elevate the bell hammer and as the lever 11 reaches its lowest position, where it is engaged by the latch 22, the trip 24 passes from engagement with the cross bar 25 and said bell hammer will fall and strike a bell 27 suitably mounted within the frame 1. In its downward movement the cross bar 25 strikes a stud 26$^a$ which checks its movement and acts to raise the hammer from contact with the bell after each operation.

To release the latch 22 a release key 28 is provided. This key is carried at the forward ends of levers 30 which levers are also connected by a cross rod 31, the ends of which project beyond the said levers, said rod being adapted to engage an arm 23$^a$ of each latch 22 as the release key 28 is depressed. Whenever, therefore, the release key 28 is depressed the previously operative latch 22 will be rocked into inoperative position and the depressed key lever 11 will be free to rise under the action of its spring 15.

It will be understood that as the key 14 is depressed the signal sector 7 of the associated counting device will be actuated to bring inscription "Vote yes," or "Vote no," thereon into position opposite the openings 8, 8$^a$, and as the key lever rises said sector will be restored to its normal position with the blank portion thereof opposite the openings 8, 8$^a$. The counting devices are so arranged that the wheels thereof will not be actuated until the full downward motion of the key lever is completed; and at the completion of such downward movement of either key lever the audible signal device 27 will be actuated, indicating that a vote has been recorded; but, as aforesaid, no indication of the nature of such vote is given to any person except the one actuating the machine and the signal sector 7 giving information as to the character of the vote is returned to its normal position upon the upward movement of the key lever. The downward movement of the key lever is checked by a stop bar 31$^a$.

To one of the levers 30 connected with the release key is attached a trip 32 adapted to engage, as said release key is depressed, an arm 33 on a rock shaft 34. This shaft 34 is mounted in bearings in suitable uprights 35 and to it is connected the hammer 36 of a bell 37. The bell 37 will therefore be struck at the completion of the downward movement of the release key 28, which, as aforesaid, releases the previously engaged latch 22 and allows the depressed key lever to rise to its normal position. The release key is normally held in its elevated position by tension springs 38 similar to the springs 15 by which the key levers 11 are elevated.

The bells 27, 37, are of different tones so that two readily distinguishable audible signals are given at every actuation of the machine, the first when the downward movement of a key lever 11 is completed and a vote has been recorded, and the second when the depressed key lever has been released and the parts of the machine thereby restored to normal position. As the signals are automatically sounded it is impossible for a voter to actuate the machine improperly without being detected.

To the top of the housing 1 is secured an indicator consisting of a suitable frame adapted to receive cards bearing inscriptions denoting the subject to which the several keys of the machine are assigned. As shown this indicator comprises a metal frame, the front of which is hinged at 39 and provided with a series of glass panels. A card bearing suitable information may be inserted within each section of such frame and be readily discernible through the glass panel thereof. Springs 40 act to hold the hinged front in closed position and a knob or hand piece 41 is provided by means of which it may be swung downwardly to permit the cards being changed as desired. Above each of said main parts of the indicator is a supplemental indicator bearing inscriptions corresponding to those upon the keys 14. It will be understood that the information given by the main indicator will be duplicated in the sections thereof corresponding to members of each pair of counting devices so that the voter will readily understand which key of each pair is to be actuated for recording votes in favor of the candidate or proposition to which the particular pair of counting devices relate, and which key is to be actuated to record votes in opposition to said question or candidate.

The apertures or slots 8 in the housing 1 are of such length as to enable the signal sector 7 as well as each of the number disks 6 of the adjacent counting device to be viewed therethrough, but normally all of such slots or apertures except the portion thereof through which the signal sector 7 is visible is concealed by the cover 3. That is, the apertures 8ª in the swinging cover 3 are of such dimensions as to permit a view of the sectors 7, while concealing the numbered disks of the counting devices. The said swinging cover is secured in its closed position by a suitable lock 42, the key to which will be retained by the party charged with the custody of the machine during its operation and such cover will be unlocked and swung into the open position shown in dotted lines in Fig. 2 only when it is desired to ascertain the number of votes that have been recorded by the machine.

As hereinbefore described, any desired number of counting mechanisms may be employed. In Figs. 1 to 4 is illustrated an embodiment of the invention containing but four of such counting mechanisms. The number of such mechanisms may be readily duplicated, however, as shown in Fig. 8, without materially increasing the size of the machine by arranging one series of counting devices 50 above and in rear of the other series 51, each being connected by a link 52 with the lever 53 of a voting key, as before described. In this form of the invention the slots in the housing 1 and cover 3 are of course duplicated so that a pair of such slots will be arranged adjacent each counting device.

With the machine is combined a suitable inclosing case having extensible side walls and a swinging lid or cover. As shown in Figs. 6 and 7 said inclosing case is of substantially the same form as the machine, but the side walls 43 thereof are of greater height than the machine and each of such sides is provided with a sliding section 44 which may be drawn forward as shown in dotted lines in Fig. 6, being secured in its forward position by any suitable fastening means. The cover or top of the casing is made in two sections, the main section 45 being hinged to the side pieces 43, as at 46, and connected to slotted links 47 which are adapted to be locked to the said sides 43, at any desired elevation. At the forward end of the main section 45 of said cover or top is hinged a supplemental section or front piece 48 which, when the machine is to be used, is turned or swung backward and over on the main section 45 as shown in Fig. 6. Said front or supplemental section is provided with a suitable knob or hand piece 49 and also with a suitable locking mechanism by which, when the machine is not in use, the inclosing case can be securely locked. It will be seen that when the side walls of the inclosing case are extended and the top adjusted into the position shown in Fig. 6, it is impossible for any but the person operating the machine to see any of the operative parts of the machine or obtain any information regarding the nature of the vote recorded, although the audible signal devices before described are actuated at each operation of the machine.

The operation of the machine which has been set forth in the above description may be briefly summarized as follows: Prior to using the machine, suitable cards will be placed within the indicator, and the person or persons having charge of the machine will unlock the swinging cover 3 and make a suitable memorandum of the numbers displayed through the several slots 8 in the front of the housing 1. Said cover 3 will then be closed and locked and thereafter at each operation of the machine one of the counting mechanisms will be actuated, the sector 7 associated with the operated key being turned to advise the voter of the nature of the vote which has been recorded by him and the bell 27 struck at the time of recording each vote.

After all the votes have been recorded, the swinging cover 3 will be unlocked and swung upwardly. The numbers then displayed on the several counting mechanisms will be noted and by deducting the numbers which were recorded prior to the commencement of the voting, the total number of votes recorded by each of the keys can be readily ascertained.

It will be seen that the present invention provides a much more satisfactory means for voting in societies and assemblies than that which is commonly in use involving the employment of balls or other bodies of different colors. The present machine not only serves all the purposes of such common method of voting, but in addition furnishes a record of the number of votes, both affirmative and negative which are registered.

What I claim and desire to secure by Letters Patent is,

1. In a voting machine, the combination of an accumulating device, a vibrating visual signal mounted coaxially with and entirely at one side of the number wheels of said device, a key lever, and means connected with the key lever for operating said signal and accumulating device.

2. In a voting machine, the combination of an accumulating device, a vibrating visual signal mounted coaxially with and entirely at one side of the number wheels of said device, a key lever, and means for actuating the accumulating device and said signal at every operation of the key lever.

3. In a voting machine, the combination of a plurality of counting mechanisms, a series of voting keys each connected with a lever adapted to actuate one of the counting mechanisms, a housing inclosing said counting mechanisms, and having therein apertures opposite the counting mechanisms, a signal device arranged adjacent each of the counting mechanisms and movable across the said aperture in the housing, said signal devices being each connected with one of the voting key levers, whereby as the lever is operated to actuate the counting mechanism, said signal will be moved opposite said aperture in the housing to indicate the nature of the vote recorded, an audible signal device adapted to be operated by either of the voting key levers and means for moving the first said signal device to inoperative position as the voting key lever returns to normal position.

4. In a voting machine, the combination of a counting mechanism, a voting key connected with a lever adapted to operate said counting mechanism, a housing inclosing said counting mechanism and having therein a slot through which the counting mechanism is visible, a signal device arranged at one side of the counting device and adapted to move across the aforesaid slot in the housing, a removable cover adapted to partially close said slot in the housing, connections between said voting key lever and said signal device for imparting a plurality of movements to said signal device at each operation of said lever, and an audible signal device adapted to be operated at each actuation of the voting key lever.

5. In a voting machine, the combination of a plurality of counting mechanisms, and a plurality of voting keys each connected with a lever adapted to operate one of said counting mechanisms, an audible signal device, a trip mounted on each voting key lever and adapted to actuate said audible signal as the lever is depressed, latches each adapted to automatically lock one of the voting key levers in depressed position, a release key movable by the voter adapted to release and move said latches to inoperative position, and a second audible signal device adapted to be actuated by said release key.

6. In a voting machine the combination of a counting mechanism, a voting key adapted to operate the counting mechanism, a housing inclosing the counting mechanism and having an aperture formed therein through which said mechanism is visible, a signal device adapted to be moved by operation of the voting key into position to be visible through said aperture in the housing, and a removable cover adapted to close that portion of the aperture in the housing through which the counting mechanism is visible.

7. In a voting machine, the combination with a plurality of counting mechanisms and a plurality of voting key levers mounted on a common axis and each adapted to operate one of the counting mechanisms, of means for locking either key lever in its depressed position, means for producing an audible signal when either voting key lever is actuated, and a release key mounted on the same axis as the voting key lever and adapted to be operated by the voter to release the lock of the previously depressed voting key lever.

In testimony whereof I have signed my name to this specification in the presence of two subscribing witnesses.

FRANS A. PETERSON.

Witnesses:
CHARLES D. STEVENSON,
JNO. E. HUNT.